(12) United States Patent
Ohmi et al.

(10) Patent No.: US 6,180,067 B1
(45) Date of Patent: Jan. 30, 2001

(54) REACTOR FOR THE GENERATION OF WATER

(75) Inventors: Tadahiro Ohmi, 2-1-17-301 Komegafukuro, Aoba-ku, Sendai-shi, Miyagi-ken; Koji Kawada, Osaka; Yoshikazu Tanabe, Iruma; Nobukazu Ikeda, Osaka; Akihiro Morimoto, Osaka; Yukio Minami, Osaka, all of (JP)

(73) Assignees: Fujikin Incorporated, Osaka; Tadahiro Ohmi, Miyagi-ken, both of (JP)

( * ) Notice: Under 35 U.S.C. 154(b), the term of this patent shall be extended for 0 days.

(21) Appl. No.: 09/160,188

(22) Filed: Sep. 25, 1998

(51) Int. Cl.$^7$ ...................................................... B01J 15/00
(52) U.S. Cl. ........................... 422/190; 422/188; 422/195; 422/211; 422/236
(58) Field of Search .................................... 422/187, 188, 422/189, 190, 191, 198, 208, 172, 171, 177, 41

(56) References Cited

U.S. PATENT DOCUMENTS 5,355,973 * 10/1994 Wagner et al. ........................ 181/258
5,609,834 * 3/1997 Hamada et al. ...................... 422/196

\* cited by examiner

*Primary Examiner*—Shrive Beck
*Assistant Examiner*—Frederick Varcoe, Jr.
(74) *Attorney, Agent, or Firm*—Griffin & Szipl, P.C.

(57) ABSTRACT

An improved reactor for generating water from hydrogen and oxygen which allows production of moisture at a high conversion rate exceeding 99 percent with the temperature kept under some 400° C. inside the reactor shell (1) and with the water vapor production being more than 1,000 sccm. One form of the reactor (FIG. 1) according to the invention is constructed with a closed cylinder divided into two compartments by an interior partition, a first reactor structural component (2) and a second reactor structural component (3), united to define a sealed interior space (1*a*). The sealed interior space (1*a*) of the reactor shell (1) is partitioned by a diffusion filter (10) into a first chamber (1*b*) provided with an inlet reflector unit (9) and a second chamber (1*c*) provided with an outlet reflector-diffuser unit (11). On the inside surface of the second reactor structural component (1*c*) is formed a platinum coated catalyst layer (13). The inlet reflector unit (9) comprises a cylindrical casing (9*a*) mounted over a starting material gas feed port (2*c*) on the inside surface of the first reactor structural component (2), side openings (9*c*) formed in the casing (9*a*) and a reflector (9*b*) closing the open end of the casing (9*a*). The outlet reflector-diffuser unit (11) has a cylindrical casing (11*a*) fixed over a water vapor gas outlet port (3*c*) on the inside surface of the second reactor structural component (3), side openings (11*e*) formed in the casing, a reflector (11*b*) closing the open end of the casing (11*a*), an outlet diffusion filter (11*c*) provided inside the casing (11*a*) and a platinum coated catalyst layer (11*d*) formed on the outlet diffusion filter (11*c*).

12 Claims, 13 Drawing Sheets

REACTOR FOR THE GENERATION OF WATER

FIELD OF THE INVENTION

The present invention relates to an improvement of a reactor for generation of moisture (i.e., water) intended chiefly for use in semi-conductor manufacturing facilities.

BACKGROUND OF THE INVENTION

In the silicon oxide film coating step by moisture oxidation process in the semi-conductor production, for example, super high-purity water vapor is required at the rate of some 1,000 cubic centimeters/minute (sccm).

Earlier, the inventors developed a reactor for generation of water which was suitable for such a purpose, the construction of which is shown in FIG. 13. It should be understood that this reactor will be referred to as prior art reactor throughout the present specification.

As shown in FIG. 13, the prior art reactor includes a reactor shell 21 comprising bottomed cylindrical first and second reactor structural components 22 and 23 put together, the first reactor structural component 22 provided with a gas feed passage 24a on the outside surface thereof and an inlet reflector unit 29a on the inside surface thereof, and the second reactor structural component 23 provided with a (water vapor) outlet passage 25a on the outside surface thereof and an outlet reflector unit 29b on the inside surface thereof, with a diffusion filter 30 provided on the borderline between the two reactor structural components 22 and 23 and with a platinum coated catalyst layer provided over the inside surface of the second reactor structural component 23.

In the prior art reactor, a starting material gas comprising a mixture of hydrogen and oxygen is led into the reactor shell through the gas feed passage 24a is diffused by a gas diffusion means comprising the inlet reflector 29a, the diffusion filter 30 and the outlet reflector 29b and brought into contact with the platinum coated catalyst layer 32. Coming in contact with the platinum coated catalyst layer 32, oxygen and hydrogen are enhanced in reactivity by the catalytic action of platinum and turned into what is called the radicalized state. The radicalized hydrogen and oxygen instantaneously react at a temperature much lower than the ignition temperature of the hydrogen-mixed gas under formation of water without undergoing combustion at a high temperature.

FIG. 14 shows the change with time in moisture-producing reactivity found in an experiment with the prior art reactor operated under the following conditions: moisture production, 1,000 sccm; and reactor temperature (temperature inside the reactor shell 21), about 400° C. The volume of the space provided with the platinum coated catalyst layer 32 (volume inside the second reactor structural component) was about 490 cc. As is evident from FIG. 14, the prior art reactor can produce water vapor at a moisture-producing reactivity efficiency of some 98.5 to 99.9 percent not only where the mixing ratio of the starting material gas between oxygen and hydrogen is optimized (with no excess of either of the two material constituent gases) but also where the mixed gas contains more oxygen or hydrogen than the other.

Thus, the prior art reactor can produce more than 1,000 sccm of water vapor (high-purity water vapor or mixture of high-purity water vapor and oxygen) with a high degree of reactivity and responsiveness and is suitable for use in the semi-conductor manufacturing technological field. The reactor also allows size reduction of the moisture-producing facilities.

However, it has been found that the prior art reactor still leaves something to be improved. That is, the prior art can not raise the moisture-producing reactivity efficiency over 99.0 percent when the temperature of the reactor shell 21 is less than some 400° C. with the moisture production not lower than 1,000 sccm. And it is feared that some one percent of unreacted oxygen or hydrogen will be mixed in the moisture produced. That makes it difficult for the reactor to reliably turn out pure water without hydrogen or oxygen mixed or a mixture of pure water and oxygen without hydrogen mixed.

Meanwhile, there are two probable causes of unreacted hydrogen or oxygen reaching the water vapor outlet passage 25a in the prior art reactor: (a) Oxygen or hydrogen flows direct into the water vapor outlet passage 25a without coming in contact with the platinum coated catalyst layer 32. (b) Hydrogen or oxygen is radicalized but proceeds unreacted with oxygen or hydrogen straight to the water vapor outlet passage 25a where the radicalized hydrogen or oxygen is unradicalized back to the original state. Of the two probable causes, it was thought that the first one was overwhelmingly greater according to various experiments conducted by the inventors and their experiences. So, the inventors carried out a moisture-producing experiment to study the moisture-generating reactivity efficiency using the prior art reactor with the outlet reflector unit 29b removed. As shown in FIG. 15, the moisture-producing reactivity efficiency stood at about 91 percent when the temperature of the reactor shell 21 was 400° C. with the moisture production at 500 sccm with the mixed material gas with an optimized mixing ratio. While the test results were not obtained under exactly the same conditions for those shown in FIG. 14 because the moisture production was different, it is noted that the moisture-producing reactivity efficiency is some 7 percent lower than that shown in FIG. 14. This difference indicates that, without the reflector unit 29b on the outlet side, a substantial amount of oxygen or hydrogen arrives unradicalized at the moisture gas outlet passage 25a and that an improvement of the reflector unit 29b on the outlet reflector unit 29b could increase the moisture-producing reactivity efficiency. Also, as FIG. 15 suggests, if the reflector unit 29b is absent on the outlet side, the moisture-producing reactivity efficiency goes down as the percentage of hydrogen in the material gas increases. When the temperature of the reactor shell is 400° C. with the moisture production at 500 sccm, for example, the moisture-producing reactivity efficiency is some 86 percent with the starting material gas with the hydrogen content being 100 percent larger than the balanced level and some 97 percent with the material gas with the oxygen content being 100 percent larger. The difference in efficiency between the two mixing ratios is some 11 percent.

That is, it is surmised that oxygen diffuses with relative ease and tends not to move in a straight line, while hydrogen is rather difficult to diffuse and tends to flow linearly inside the reactor shell 21 of the construction as shown in FIG. 13. With hydrogen-rich starting material gas, therefore, it is considered that the tendency for hydrogen to flow linearly is so strong that oxygen is swept along with the hydrogen and reaches the water vapor outlet passage 25a unradicalized to a great extent.

Based on that theory, the inventors concluded that if the outlet reflector unit 29b in the reactor shell 21 was so improved as to enhance the diffusion of especially hydrogen, still a higher yield than the moisture producing reactivity efficiency or reaction rate of some 98 to 99 percent shown in FIG. 14 could be achieved not only with oxygen-rich starting material gas but also with hydrogen-rich starting material gas.

The present invention was built on that theory.

SUMMARY OF THE INVENTION

It is an object of the present to provide a reactor for generation of moisture which can further raise the reaction rate of hydrogen and oxygen in the reaction shell of the same construction as that of the prior art reactor without causing the temperature to rise in the reactor shell that can achieve a reaction rate of more than 99 percent under the conditions that the temperature of the reactor shell is less than some 400° C. with the moisture production at more than 1,000 sccm.

The object of the present invention is attained by providing either of the following two types of reactor for generation of moisture. The first type reactor for generation of moisture comprises: a reactor shell formed with a first reactor structural component and a second reactor structural component united to define a sealed interior space; a starting material gas feed port provided in the first reactor structural component to feed the starting material gas into the interior space; a water vapor outlet port provided in the second reactor structural component to lead out the product water out of the interior space; an inlet reflector unit provided in the interior space, the unit placed over the starting material gas feed port and comprising a cylindrical casing mounted on the first reactor structural component, side openings formed in the casing and a reflector closing the end opening of the casing; an outlet reflector-diffuser unit provided in the interior space over the moisture gas outlet port and comprising a cylindrical casing mounted on the second reactor structural component, side openings formed in the casing and a reflector closing the end opening of the casing, a diffusion filter on the outlet side provided inside the casing and a platinum coated catalyst layer formed on the outlet diffusion fitter; a diffusion filter partitioning the interior space into a first chamber with the inlet reactor unit provided therein and a second chamber with the outlet reflector-diffuser unit provided therein; and a platinum coated catalyst layer formed on the inside surface of the reactor shell over the area facing the second chamber. It is desired that the diffusion filter has through pores not larger than 200 microns and the diffusion filter on the out let side has through pores not smaller than 50 microns. It is also desired that the platinum coated catalyst layer is of the double layer construction having a barrier coat made of nitride with a platinum coat formed on the surface.

In the first type reactor for generation of moisture, the starting material gas comprising a mixture of hydrogen and oxygen is fed into the first chamber from the starting material gas feed port and is diffused by the reflector unit on the inlet side and further diffused while passing through the diffusion filter before entering the second chamber. In the second chamber, most of hydrogen and oxygen are radicalized upon crashing against or coming in contact with the platinum coated catalyst layer. The instant that they are radicalized, hydrogen and oxygen almost all react to form water. Part of hydrogen and oxygen may move straight toward and crash against the reflector of the reflector-diffuser unit on the outlet side and diffuse again. That substantially reduces the amount of hydrogen and oxygen which arrive at the diffusion filter on the outlet side through the through pores in the reflector-diffuser unit without coming in contact with the platinum coated catalyst layer. Furthermore, inside the reflector-diffuser unit on the outlet side is provided a platinum coated catalyst layer on the outlet diffusion filter. Because of this arrangement, the hydrogen and oxygen arriving inside the casing of the outlet reflector-diffuser unit through the side openings without coming in contact with the platinum coated catalyst layer in the second chamber have little chance of flowing straight into the water vapor outlet port without coming in contact with the platinum coated catalyst layer on the filter inside the outlet reflector-diffuser unit and without being radicalized. In other words, the hydrogen or oxygen which arrives unradicalized is bound to be radicalized by the platinum coated catalyst layer formed on the outlet diffusion filter. Thus, hydrogen and oxygen are radicalized almost completely, and radicalized hydrogen and oxygen instantaneously react into water. In addition, the outlet diffusion filter provided inside the casing further minimizes the probability that radicalized hydrogen and oxygen proceed unreacted to the water vapor outlet port. This way, radicalized hydrogen and oxygen almost all contribute to a moisture-forming reaction.

The second type of reactor for generation of moisture comprises: a reactor shell formed with a first reactor structural component and a second reactor structural component united to define a sealed interior space; a starting material gas feed port provided in the first reactor structural component to feed the material gas into the interior space; a water vapor outlet port provided in the second reactor structural component to lead out the product water out of the interior space; an inlet reflector unit provided in the interior space, the unit placed over the starting material gas feed port to diffuse the material gas fed from the material gas feed port; an outlet plate-shaped reflector-diffuser unit provided in the interior space over the water vapor outlet port with only a small gap held between the unit and the inside surface of the second structural component; a diffusion filter partitioning the interior space into a first chamber with the inlet reactor unit provided therein and a second chamber with the outlet reflector-diffuser unit provided therein; and a platinum coated catalyst layer formed on the inside surface of the reactor shell over the area facing the second chamber. In a preferred embodiment, the reflector unit on the inlet side, as in the first type reactor, is formed of a cylindrical casing mounted on the bottom wall surrounding the starting material gas feed port, side openings formed in the casing and a reflector closing the end opening of the casing, or, as in the reflector unit on the outlet side, is formed in a shape of a plate placed with only a small gap kept from the first reactor structural component. It is desired that the gap between the outlet reflector unit and the second reactor structural component is between 0.5 and 2.0 mm, generally 1 mm or so. It is also desirable that the reflector unit on the outlet side should be as large as possible on condition that a specific gap can be secured. The gap is preferably between 0.5 and 2.0 mm as indicated. Also, the same platinum coated catalyst layer as that on the bottom wall of the second reactor structural component may be formed on the reverse side of the outlet reflector unit, that is, on the side facing the bottom wall of the second reactor structural component. It is desired as well that, as in the first type, the diffusion filter has through pores not larger than 200 microns and that the platinum coated catalyst layer is of the double layer construction having a barrier coat made of nitride with a platinum coated catalyst layer formed on the surface.

In the second type reactor for generation of moisture, as in the first type reactor for generation of moisture, the starting material gas comprising a mixture of hydrogen and oxygen is diffused by the reflector unit on the inlet side and is further diffused while passing through the diffusion filter before entering the second chamber. In the second chamber, the starting material gas of hydrogen and oxygen crashes against uniformly all over the platinum coated catalyst layer area and forms water. The water vapor produced chiefly in the second chamber is led into the water vapor outlet port through the gap between the outlet reflector unit and the second structural component. Most of hydrogen and oxygen, which enter the second structural component are radicalized upon crashing against or coming in contact with the platinum coated catalyst layer. The instant that they are radicalized, almost all hydrogen and oxygen react to form water. Some hydrogen and oxygen may move straight toward and crash against the reflector of the reflector-diffuser unit on the outlet side and diffuse again. That substantially reduces the amount of hydrogen and oxygen which arrives at the gap without coming in contact with the platinum coated catalyst layer. Furthermore, since the platinum coated catalyst layer is provided on the inside surface of the second structural component over the area facing the plate-shaped outlet reflector unit, some hydrogen or oxygen that could arrive in the gap between the outlet reflector unit and the second reactor structural component would be activated within the gap. That further minimizes the probability that hydrogen and oxygen will be discharged unradicalized. This way, radicalized hydrogen and oxygen almost all contribute to a moisture-forming reaction. In addition, since the interior space is provided with a gas diffusion means comprising the inlet reflector unit, diffusion filter and outlet reflector unit, there will be caused no local heating of the platinum coated catalyst layer by heat of reaction. Thus, with the temperature kept under some 500° C. all over the platinum coated catalyst layer, the moisture-producing process can proceed at a high conversion rate exceeding about 99.5 percent with a high degree of responsiveness to produce not smaller than 1,000 sccm on a safe and continuous basis.

DESCRIPTION OF PREFERRED EMBODIMENTS

Figure 1:
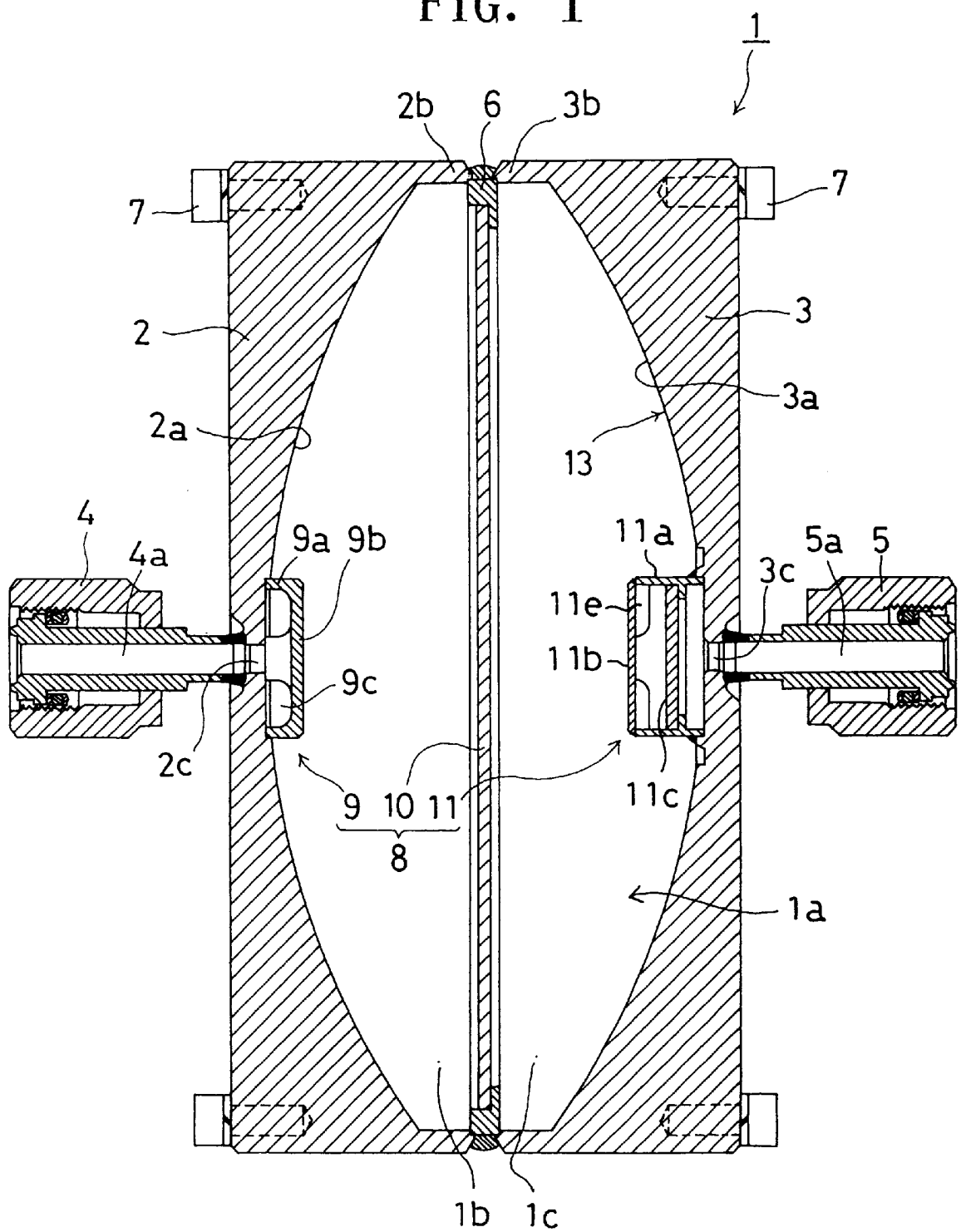
FIG. 1 is a vertical sectional side view of an example of the first type reactor for generation of moisture according to the present invention.
Figure 2:
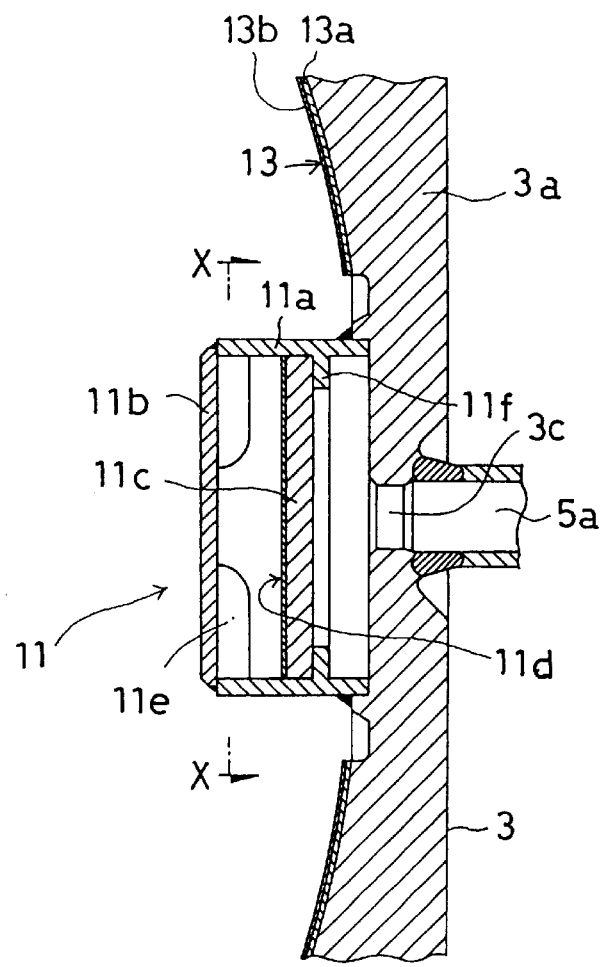
FIG. 2 is an enlarged detail view of the inventive core, the part reflector-diffuser unit on the outlet, side in FIG. 1.
Figure 3:
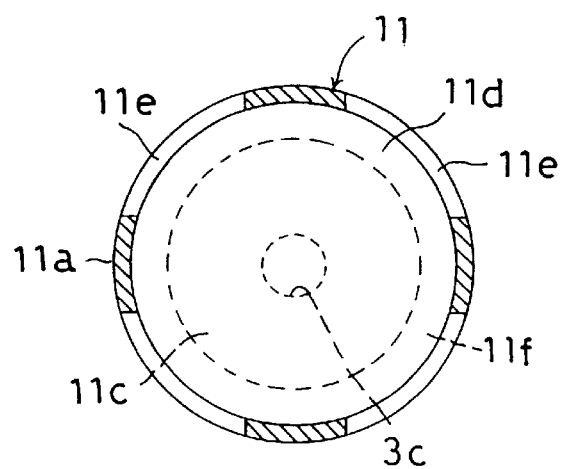
FIG. 3 is a cross section taken on line X—X line in FIG. 2.

FIGS. 1 to 3 show one form of the first type reactor for generation of moisture according to the present invention.

In the reactor for generation of moisture (model 1 reactor) shown in FIG. 1, the reference number 1 indicates a reactor shell made tip of a first and second structural components 2 and 3; the number 4, a gas feed joint connected to the first reactor structural component 2; the number 5, a water vapor take-out joint provided in the second reactor structural component; the number 7, reactor-mounting bolts screwed in the respective reactor structural components 2 and 3; the number 8, a gas diffusion means comprising a reflector unit 9 on the inlet side, a diffusion filter 10 and a reflector-diffuser unit on the outlet side 11; and the number 13, a platinum coated catalyst layer as catalyst.

The respective reactor structural components 2 and 3 are separately formed of a heat-resistant material such as stainless steel (in the present example, the material under the JIS designation SUS 316L) in the shape of a bottomed cylinder comprising a cylindrical peripheral wall 2b or 3b and a circular bottom or end wall 2a or 3a. In the present example, the two reactor structural components 2 and 3 are configured in bottomed cylinders and have the same length in the axial direction—33.5 mm—with the peripheral walls 2b and 3b identical—134 mm. Forming the two reactor structural components 2 and 3 in the same or about the same shape simplifies the construction of there actor shell 1 and reduces the production costs. Furthermore, the bottom walls 2a and 3a of the reactor structural components 2 and 3 are concave (hemispherical) on the inside surface with an identical radius of curvature (108 mm). The respective bottom walls 2a and 3a may be made flat on the inside surface, orthogonal to the peripheral walls 2b, 3b. The open ends of the peripheral walls 2b and 3b of the two reactor structural components 2 and 3 are jointed into a reactor shell of a hollow construction with a sealed interior space 1a. The open ends 2b and 3b are put together with a ring-shaped diffusion filter flange 6 therebetween. The jointing is effected by welding. Welding may be substituted by a separable clamp jointing or the like. In that case, it is desired that an appropriate seal such as gasket is provided on the clamp. The two reactor structural components 2 and 3 in FIG. 1 are formed in almost the same shape. One component may be formed in the shape of a bottomed cylinder, while the other may be a flanged structural component which closes the opening of the former. Anyway, the two reactor structural components maybe freely formed, as long as the two pieces can be put together to form a sealed interior space 1a.

The first reactor structural component 2 is provided with a starting material gas feed port 2c in the center of the bottom wall 2a where the starting material feed port 2c passing through the component 2 is formed. The starting material gas feed port 2c communicates with a gas feed passage 4a of the gas feed joint 4 connected to the first reactor structural component 2. In the center of the bottom wall 3a of the second reactor structural component 3 is formed a water vapor outlet port 3c which passes therethrough. The water vapor outlet port 3c communicates with a water vapor outlet passage 5a of the water vapor take-out joint 5 mounted on the second reactor structural component 3. The starting material gas feed port 2c and the water vapor outlet port 3c are placed as opposed to each other on the common line of axis of the reactor structural components 2 and 3.

The gas diffusion means 8 provided in the interior space 1a of the reactor shell 1 comprises a reflector unit 9 on the inlet side, a diffusion filter 10 and a reflector-diffuser unit on the outlet side 11 as shown in FIG. 1.

The reflector unit on the inlet side 9 is mounted over the starting material gas feed port 2c on the inside surface of the first reactor structural component 2. The inlet reflector unit 9 comprises a short cylindrical casing 9a attached on the inside surface of the bottom wall 2a of the first reactor structural component 2 and surrounding the starting material gas feed port 2c concentrically; a plurality of side openings 9c formed in the casing 9a; and a reflector 9b closing the end opening of the casing 9a. The casing 9a is attached to the bottom wall 2a by welding. In the present example, the casing 9a of the inlet reflector unit 9 is 22 mm in outside diameter and 5 mm in height (length in the direction of axis).

The diffusion filter 10 is a disk made of a heat-resistant material and has through pores preferably not larger than 200 microns in diameter. The diffusion filter 10 used in the present example is a mesh filter about 1.7 mm in thickness formed by laminating a number of stainless steel meshes having through pores with a mean diameter of 200 microns. The diffusion filter 10 is clamped to the joint between the two reactor structural components 2 and 3 by means of the flange 6 provided on the periphery of the filter 10, and partitions the interior space 1a of the reactor shell 1 into the first and second chambers 1b and 1c, the first chamber 1b provided with the inlet reflector unit 9 and the second chamber 1c provided with the outlet reflector-diffuser unit 11. While the present example uses a disk-shaped diffusion filter 10 with all the surface as filtration area, the filter may be a disk in shape but with the peripheral edge alone as filtration area (gas permeating area).

The reflector-diffuser unit on the outlet side 11 is mounted over the water vapor outlet port 3c on the inside surface of the second reactor structural component 3 as shown in FIGS. 2 and 3. The outlet reflector-diffuser unit 11 comprises a short, cylindrical casing 11a fixed to the inside surface of the bottom wall 3a of the second reactor structural component 3, surrounding the moisture gas outlet port 3c concentrically; a reflector 11b closing the end opening of the casing 11a; a diffusion filter 11c on the outlet side fixed within the casing 11a in parallel with the reflector 11b; a platinum coated catalyst layer on the filter 11d, the layer formed on the outlet diffusion filter 11c; a plurality of side openings 11e formed in the casing 11a between the reflector 11b and the outlet diffusion filter 11c; and a ring-shaped diffusion filter stopper 11f to hold the outlet diffusion filter 11c, the stopper 11f formed integrally with the casing 11a on the inside wall thereof. The casing 11a is welded to the bottom wall 3a.

The component parts of the outlet reflector-diffuser unit 11, including the casing 11a and the reflector 11b, are all formed of stainless steel (such as one under the JIS designation SUS 316L), and the reflector 11b is spot-welded to the casing 11a. And the outlet diffusion filter 11c is a stainless steel filter having through pores not smaller than 50 microns.

On the surface of the outlet diffusion filter 11c, that is, on the surface facing the casing 11b is formed a platinum coated catalyst layer on the filter 11d, the layer being 0.2 to 8 microns in thickness. The platinum coated catalyst layer on the filter 11d is of the double layer construction having a barrier coat made of TiN with a platinum coat formed on the surface, the barrier coat being 0.1 to 5 microns in thickness (in the present example, 2 microns thick) and the platinum coat 0.1 to 3 microns in thickness (in the present example, 2 microns thick). Clogging the outlet diffusion filter 11c by the platinum coated catalyst layer 11c is avoided by selecting mesh through pores not smaller than 50 microns (in the present example, 70 microns) in the stainless filters used in the outlet diffusion filter 11c. The filter platinum coated catalyst layer 11d is formed the same way as the platinum coated catalyst layer 13 on the inside surface of there actor shell 1. No detailed description is given now but it will be described in detail later. The filter platinum coated catalyst layer 11d can also be provided inside the outlet diffusion filter 11c.

The dimensions including the outside diameter of the component parts 9 and 11 of the gas diffusion means 8 are set on the basis of such factors as the moisture producing conditions and the configuration of the reactor structural components 2 and 3. In the present example, the casings 9a and 11a are 22 mm in outside diameter. The axial length of the casing 9a is 5 mm and that of the casing 11a is 10.5 mm. It is generally preferred that the interval between the bottom wall 2a and the reflector 9b is about ⅙ that between the bottom wall 2a and the diffusion filter 10 and that the gap between the bottom wall 3a and the reflector 11b is ⅓ that between the bottom wall 3a and the diffusion filter 10. But the reflectors 9b and 11b may placed closer to the respective bottom walls, thereby reducing the amount of gas passing through the central area of the diffusion filter 10.

The platinum coated catalyst layer 13 is formed all over the inside surface of the second reactor structural component 3 facing the second chamber 1c in the interior space 1a of the reactor shell 1. But no platinum coated catalyst layer is formed over the area on which the outlet reflector-diffuser unit 11 is attached as shown in FIG. 2. The platinum coated catalyst layer 13 is of the double layer construction, formed of a TiN barrier coat 13a and a platinum coat formed thereon. The thickness of the lower layer barrier coat 13a is preferably 0.1 to 5 microns. In the present example, a TiN barrier coat 13a about 2 microns in thickness is formed by ion plating technique. The platinum coat 13b, the core of the platinum coated catalyst layer 13, is preferably 0.1 to 3 microns in thickness. In the present example, a platinum coat 13b about one micron in thickness is formed by vacuum deposition process. Other methods of forming a barrier coat 13a than the ion plating technique may used. They include the physical vapor deposition (PVD) and chemical vapor deposition (CVD) processes such as ion sputtering and vacuum deposition and also hot press method and flame spray coating. A platinum coat 13b may be formed not only by the vacuum deposition process but also by such methods as ion plating and ion sputtering techniques, chemical vapor deposition and hot press. Platinum plating is also possible in case the barrier coat 13a is made of an electroconductive material such as TiN.

In the model 1 reactor thus constituted, the starting material gas is jetted into the casing 9a of the inlet reflector unit 9 through the gas feed passage 4a. The starting material gas thus jetted hits the reflector 9b, and disperses into the first chamber 1b by way of the side openings 9c in the casing 9a and, diffused in the first chamber 1b, passes uniformly through nearly all over the surface of the diffusion filter 10 into the second chamber 1c. In the second chamber, the starting material mixed gas of hydrogen and oxygen uniformly collides against all over the platinum coated catalyst layer 13, where the gas is put to what is called the catalytic activation. The activated hydrogen and oxygen instantaneously react to form water inside the second reactor structural component 3. And the water vapor formed chiefly in the second chamber 1c flows through the side openings 11e and the outlet diffusion filter 11c of the outlet reflector-diffuser unit 11 to the water vapor outlet port 3c and then to the water vapor outlet passage 5a.

Most of hydrogen and oxygen entering the second chamber 1c through the diffusion filter 10 hit against or come in contact with the platinum coated catalyst layer 13 or the platinum coat 13b to be radicalized. Almost all the radicalized hydrogen and oxygen react instantaneously into water. Meanwhile, part of the mixed gas of hydrogen and oxygen may flow straight upon entering the second chamber 1b. The mixed gas then hits against the reflector 11b to be diffused again. That drastically reduces the amount of hydrogen and oxygen that reach the outlet diffusion filter 11c through the side openings 11e without coming in contact with the platinum coat 13b. Furthermore, the model 1 reactor is provided with the platinum coated catalyst layer 11d on the outlet diffusion filter 11c in the outlet reflector-diffuser unit 11. That leaves almost no chance that the hydrogen and oxygen arriving inside the casing 11a through the side openings 11e without coming contact with the platinum coated catalyst layer 13 flow out uncaught to the water vapor outlet port 3c. The chances are that the hydrogen and oxygen will come in contact with the platinum coated catalyst layer on the filter 11d to be radicalized. In other words, the mixed gas of hydrogen and oxygen which come straight to the outlet diffusion filter 11c is bounded to be caught and radicalized by the platinum coated catalyst layer 11d thereon. The radicalized hydrogen and oxygen react instantaneously into water. That leaves almost no hydrogen or oxygen unradicalized.

In addition, the casing 11a is provided with the diffusion filter 11c on the outlet side, which further reduces the probability of radicalized hydrogen and oxygen flowing unreacted into the water vapor outlet port 3c. That is, almost all radicalized hydrogen and oxygen contribute to production of water.

Besides, the reactor shell 1 has therein the gas diffusion means 8 comprising the reflector unit 9 on the inlet side, the diffusion filter 10 and the reflector-diffuser unit on the outlet side 11. The provision precludes the possibility of the platinum coated catalyst layer 13 being locally heated by the heat of reaction and allows formation of water with the temperature kept under some 500° C. almost all over the platinum coated catalyst layer 13. That makes it possible to produce water at a high conversion ratio exceeding about 99 percent with a high degree of responsiveness in not smaller than 1,000 sccm of moisture on a safe and continuous basis.

Figure 4:
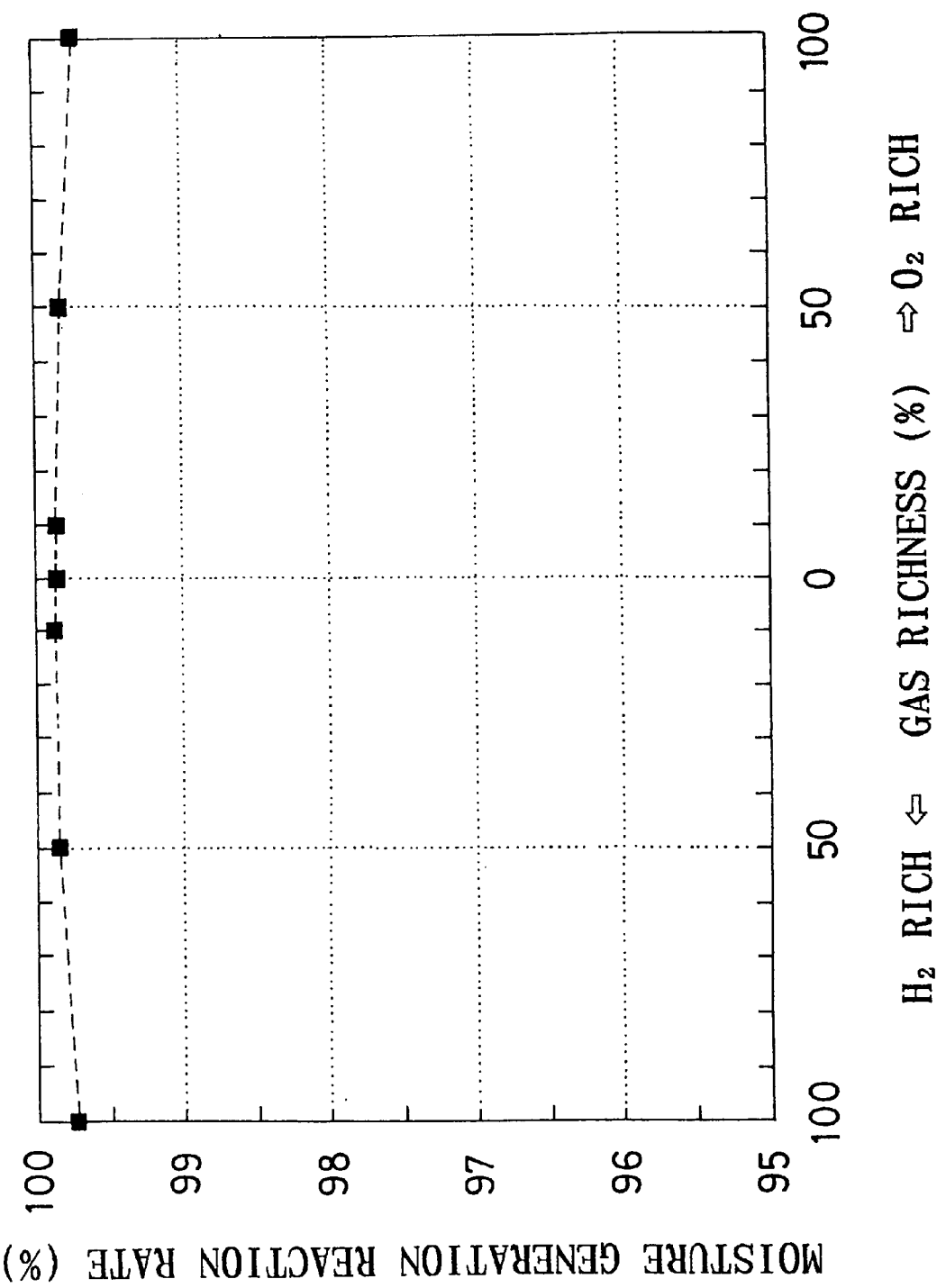
FIG. 4 depicts a curve showing the relationship between the moisture reaction rate and the gas richness in the starting material mixed gas in the first type reactor for generation of moisture according to the present invention.

That is confirmed by a moisture generation experiment conducted in a 10-hour continuous operation using the model 1 reactor as shown in FIG. 1. The dimensions of the reactor include the following: the catalytic area (surface area of the platinum coated catalyst layer 13), 181.3 cm2; volume of the second chamber, 236.4 cm3; H2O gas, 1,000 sccm. In the moisture generation experiment, the mixing ratio of hydrogen and oxygen in the starting material gas fed from the gas feed passage 4a was varied with measurements taken of the quantity of moisture flowing out to the water vapor gas outlet passage 5a to find the moisture generation reaction rate. The results are illustrated in FIG. 4. As is evident from FIG. 4, a moisture producing reactivity efficiency or reaction rate of 99.7 percent or higher could be achieved not only with oxygen-rich starting material gas but also with hydrogen-rich starting material gas, not to mention the balanced mixture with no excess of either hydrogen or oxygen.

Figure 5:
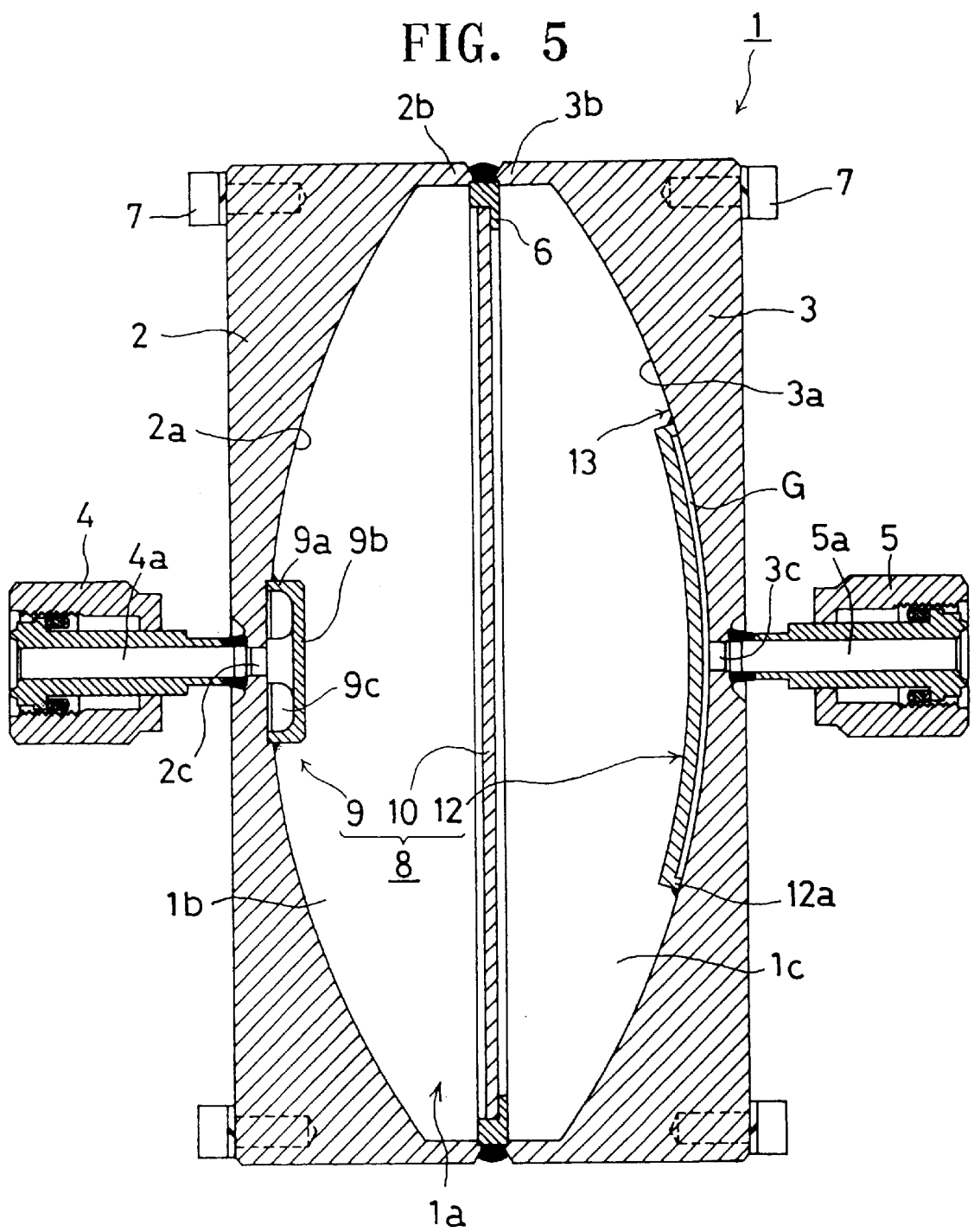
FIG. 5 is a vertical sectional side view of an example of the second type reactor for generation of moisture according to the present invention.

FIG. 5 shows one form of the second type reactor for generation of moisture (model 2 reactor) according to the present invention.

In the model 2 reactor for generation of moisture shown in FIG. 5, the reference number 1 indicates a reactor shell made up of a first and second structural components 2 and 3; the number 4, a gas feed joint connected to the first reactor structural component 2; the number 5, a moisture gas take-out joint provided in the second reactor structural component 3; the number 7, reactor-mounting bolts screwed in the respective reactor structural components 2 and 3; the number 8, a gas diffusion means provided in the interior space 1a of the reactor shell 1; and the number 13, a platinum coated catalyst layer formed inside the reactor shell 1 as catalytic coat.

The model 2 reactor is identical with the model 1 reactor in configuration except the arrangements of the gas diffusion means 8 in which a plate-shaped reflector unit 12 on the outlet side is used in the model 2 reactor in place of the reflector-diffuser unit on the outlet side 11. The other details are identical and are indicated by the same reference numbers as in FIGS. 1 to 3 and will not be explained. Needless to say, the same is applicable to possible variations or modifications of the components and component parts of the same configuration as in the model 1 reactor. In the model 2 reactor, the gas diffusion means 8 comprises a reflector unit on the inlet side 9, a diffusion filter 10 and a reflector unit 12 as shown in FIG. 5. The inlet reflector unit 9 and the diffusion filter 10 are identical in configuration with those in the model 1 reactor. The outlet reflector unit 12 is formed of a stainless steel (under the JIS designation SUS 316L) in the shape of a disk some 2 mm in thickness and 55 mm in outside diameter. The outlet reflector unit disk 12 is so semi-spherical in shape as to be parallel with the inside surface of the bottom wall 3a of the second reactor structural component 3. The outlet reflector unit 12 is fixed concentrically with the water vapor outlet port 3c defined in the center of the bottom wall 3a of the second reactor structural component 3. To illustrate in further detail, the disk 12 (which serves as an outlet reflector) is welded to the bottom wall 3a of the second reactor structural component 3 by four legs 12a provided on the periphery thereof with a specific, narrow gap kept from the bottom wall 3a on which the platinum coated catalyst layer is formed. The outside dimension of the outlet reflector unit 12 and the gap to the bottom wall 3a are chosen on the basis of such factors as the production of moisture and the outside dimension of the reactor shell 1. This way, moisture can be generated at a high reaction rate exceeding 99.5 percent even with a H2-rich starting material mixed gas. The outside dimension of the outlet reflector unit 12 is preferably so set that the area is 15 to 25 percent or larger than that defined by the platinum coated catalyst layer 13. A area smaller than 15 percent would be insufficient to diffuse the starting material gas or bring the starting material gas in contact with the platinum coated catalyst layer 13. In the present example, the outlet reflector unit 12 is a circular stainless steel plate with an outside diameter of 55 mm, the surface area thereof being 17.4 percent that of the catalytic area or platinum coated catalyst layer 13. The gap G is preferably 0.5 to 2.0 mm. In the present example, the gap G is set at about 1 mm. If the gap G is less than 0.5 mm, the generated moisture will be difficult to lead out smoothly and also could give rise to such problems as increased internal pressure in the reactor shell 1. A gap G larger than 2.0 mm could also cause problems such as a decreased moisture reaction rate, that is, it would be difficult to maintain the reaction rate at or above 99.5 percent on a constant basis. The platinum coated catalyst layer 13 on the inside surface of the second reactor structural component is identical with that in the model 1 reactor in construction and form. That is, it is of the double layer made up of a barrier coat 13a and a platinum coat 13b as shown in FIG. 2. This platinum coated catalyst layer 13 is also formed on the part of the inside area which faces the outlet reflector unit 12, that is, the layer 13 covers all over the inside area of the second reactor structural component 3 except the section defining the water vapor outlet port 3c.

Figure 6:
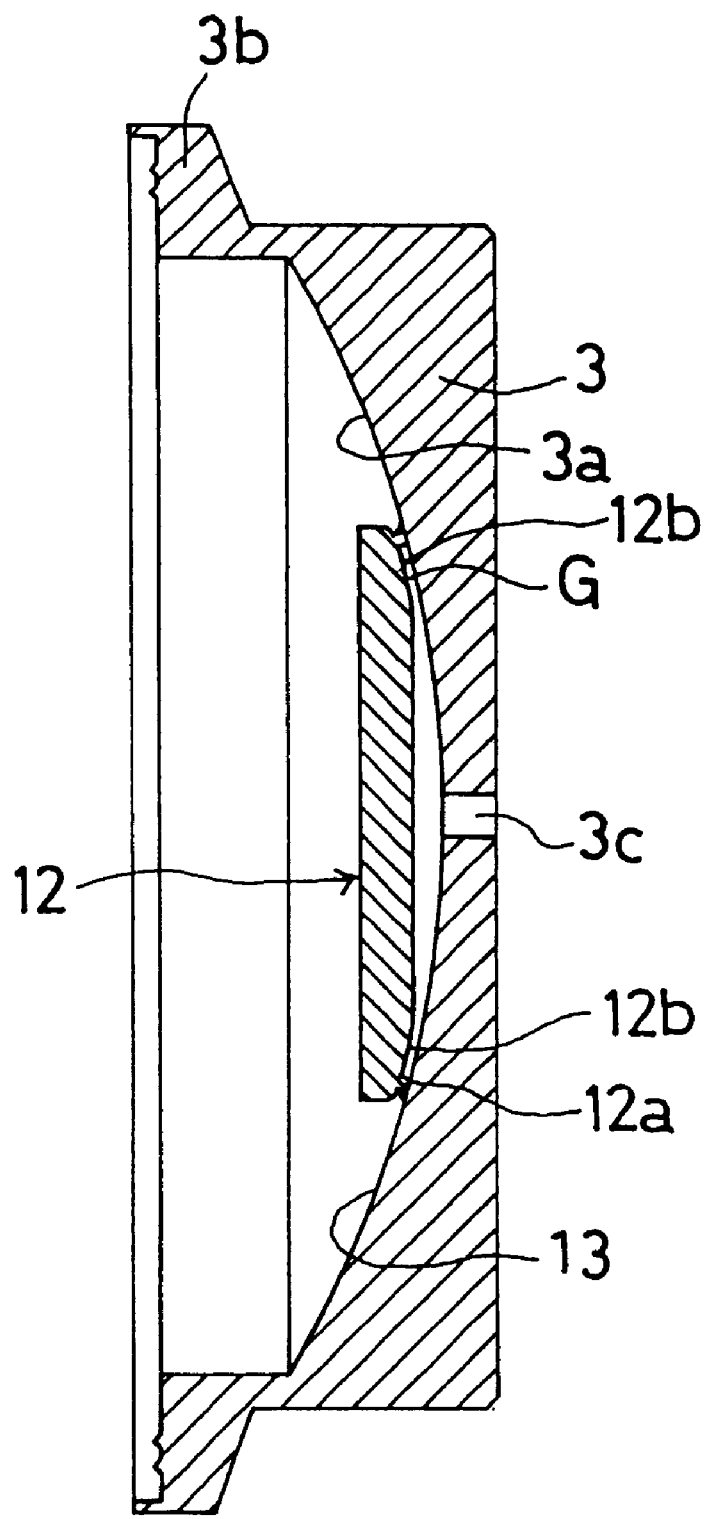
FIG. 6 is a vertical sectional side view of a variation of the outlet reflector unit of the second type reactor for generation of moisture.
Figure 7:
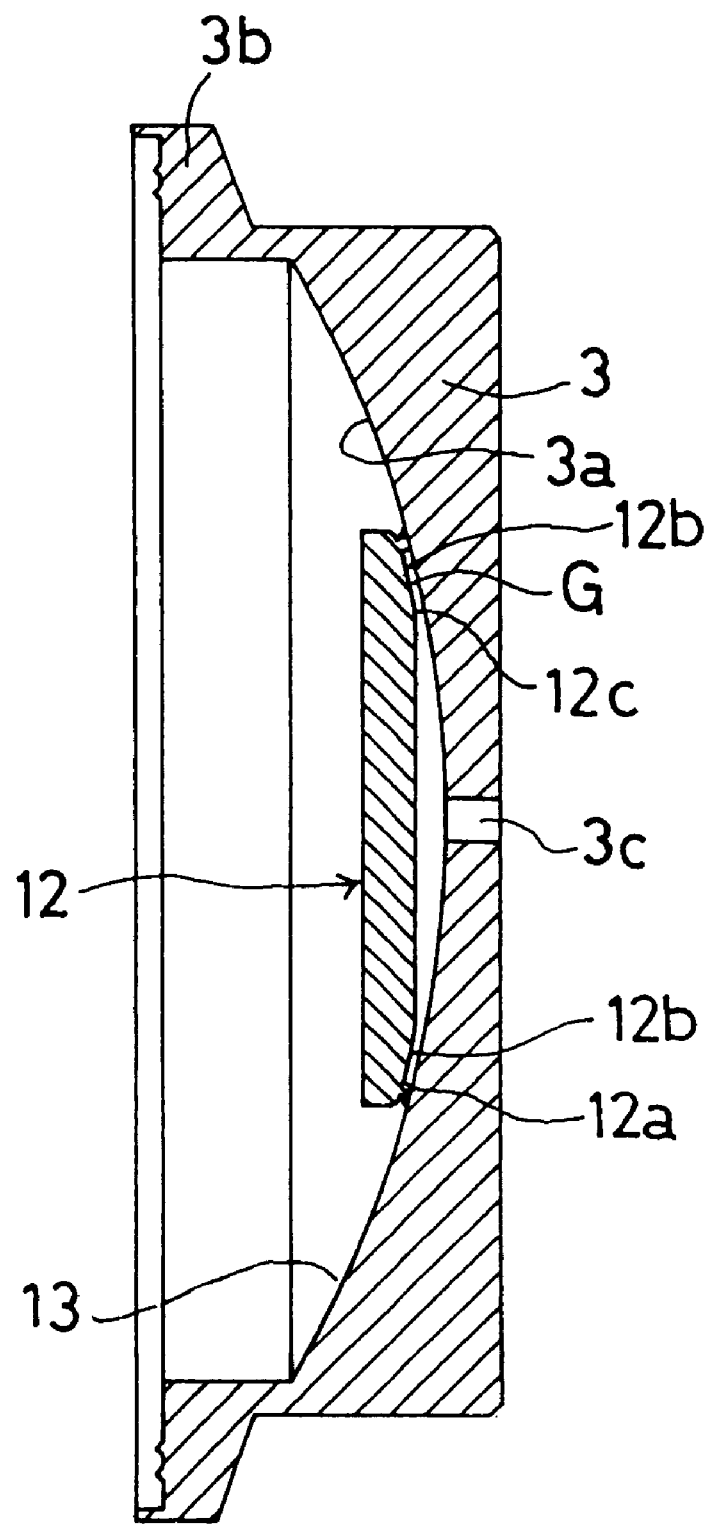
FIG. 7 is a vertical sectional side view of another variation of the second type reactor for generation of moisture corresponding to FIG. 6.

It is noted that the outlet reflector unit 12 in the model 2 reactor may be a thick plate of stainless steel with the edge 12b rounded on one side so as to define a gap G to the inside surface of the bottom wall 3a of the second reactor structural component 3 as shown in FIG. 6. Also, the same platinum coated catalyst layer 12c as the platinum coated catalyst layer 13 on the bottom wall 3a may be formed on the reverse side of the outlet reflector unit 12, or the side facing the water vapor outlet port 3c as shown in FIG. 7.

Figure 8:
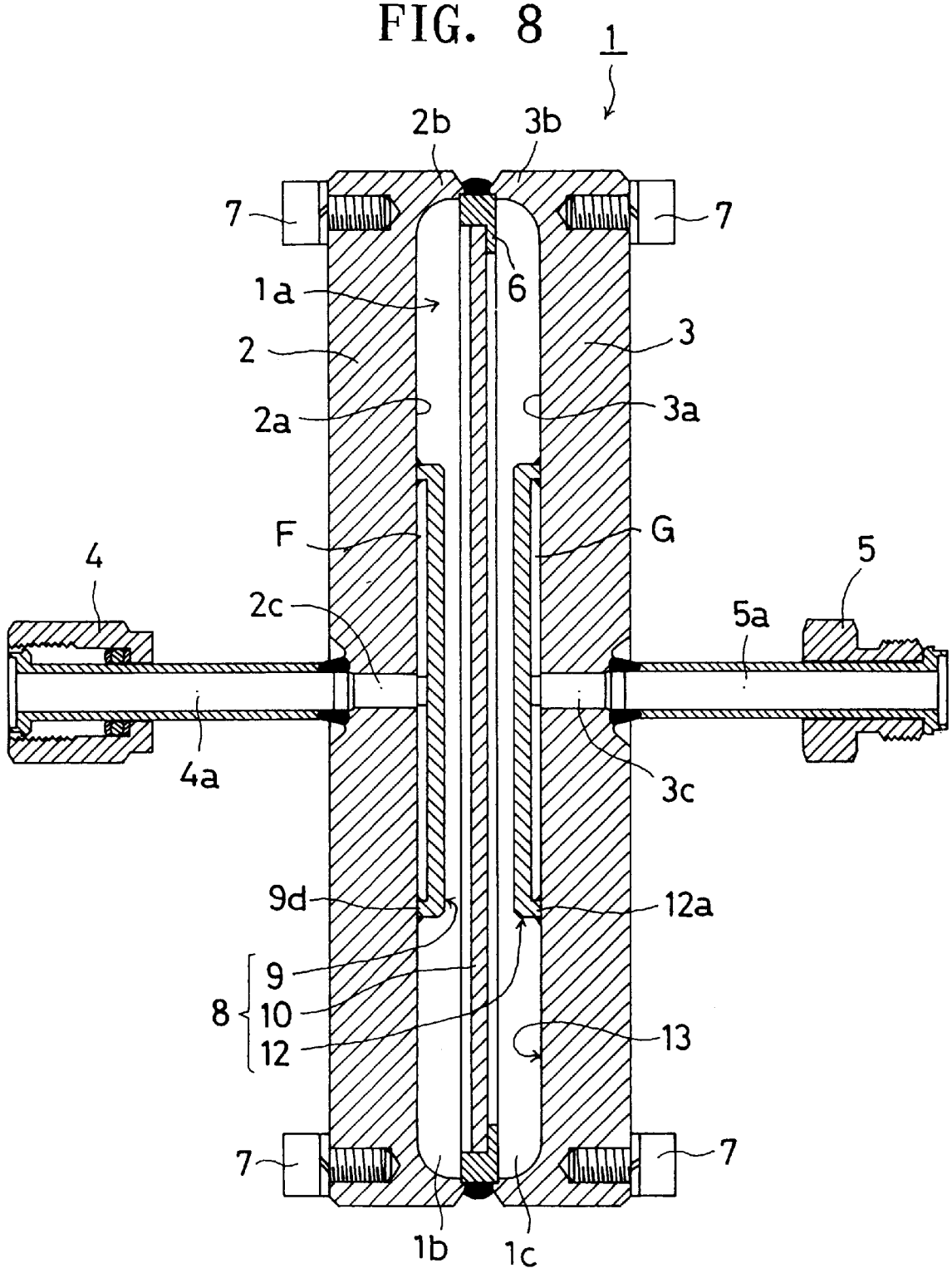
FIG. 8 is a vertical sectional side view of a further variation of the second type reactor for generation of moisture corresponding to FIG. 5.
Figure 9:
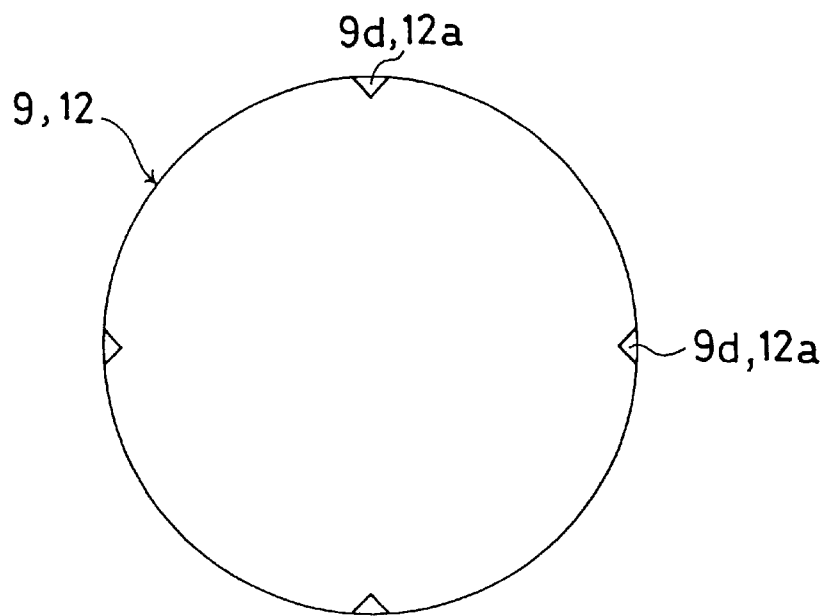
FIG. 9 is a front view of the inlet or outlet reflector unit of the reactor in FIG. 8.
Figure 10:
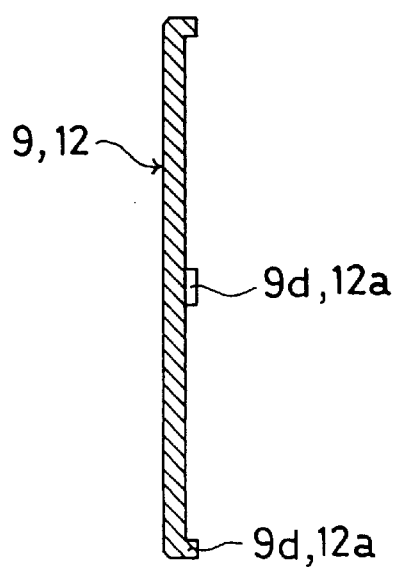
FIG. 10 is a vertical sectional side view of the inlet or outlet reflector unit of the reactor in FIG. 8.

FIGS. 8 to 10 show a variation example of the second type reactor for generation of moisture.

The reactor for generation of moisture (model 3 reactor) shown in FIGS. 8 to 10 is identical with the model 1 and model 2 reactors in construction except for the shape of the inside surfaces of bottom walls 2a and 3a of the respective reactor structural components 2 and 3 and the inlet and outlet reflector units 9 and 12 making up a gas diffusion means 8. The other arrangements, which are identical with those in the model 1 and 2 reactors, are indicted in the same reference numbers used in FIGS. 1 to 3 and FIG. 5 and will not be described. Needless to say, the same is applicable to possible variations or modifications of the components and component parts of the same configuration as in the model 1 reactor or the model 2 reactor.

In the model 3 reactor, the inside surfaces of the bottom or end walls 2a and 3a of the respective reactor structural components 2 and 3 are flat and orthogonal to the common axial line of the peripheral walls 2b and 3b as shown in FIG. 8. This configuration allows reduction of the thickness of the reactor shell 1 (length in the line of axis) and the size thereof. In present example, the respective reactor structural components 2 and 3 are made of the stainless steel SUS 316L and 114 mm in outside diameter and 15.5 mm in thickness (length in the line of axis). The platinum coated catalyst layer is provided in the same form, construction and place as in the model 2 reactor.

The respective reflector units 9 and 12 are shaped like a circular disk, concentric with the starting material gas feed port 2c and the water vapor outlet port 3c and kept away from the bottom walls 2a and 3a of the respective reactor structural components 2 and 3 with very narrow gaps F and G provided as shown FIGS. 8 to 10. On the peripheries of the respective disks 9 and 12 are formed legs 9d and 12a by which the disks are attached to the respective bottom walls 2a and 3a. In the present example, the respective reflector units 9 and 12 are formed of the stainless steel SUS 316L and are 2 mm in thickness and 50 mm in outside diameter. The ratio of the catalytic area (ratio of the inside surface area of the reflector unit 12 to area of the platinum coated catalyst layer 13) is 20 percent. On the peripheries are formed four legs 9d and four legs 12a, and each about 1 mm high at an angle of 90 degrees to the disk surface. Those legs 9d and 12a are spot welded to the respective bottom walls 2a and 3a. The gaps F and G are set on the basis of such factors as moisture generation conditions. But the gap G in particular is preferably 0.5 to 2.0. In the present example, the gap G is set at about 1 mm.

Figure 11:
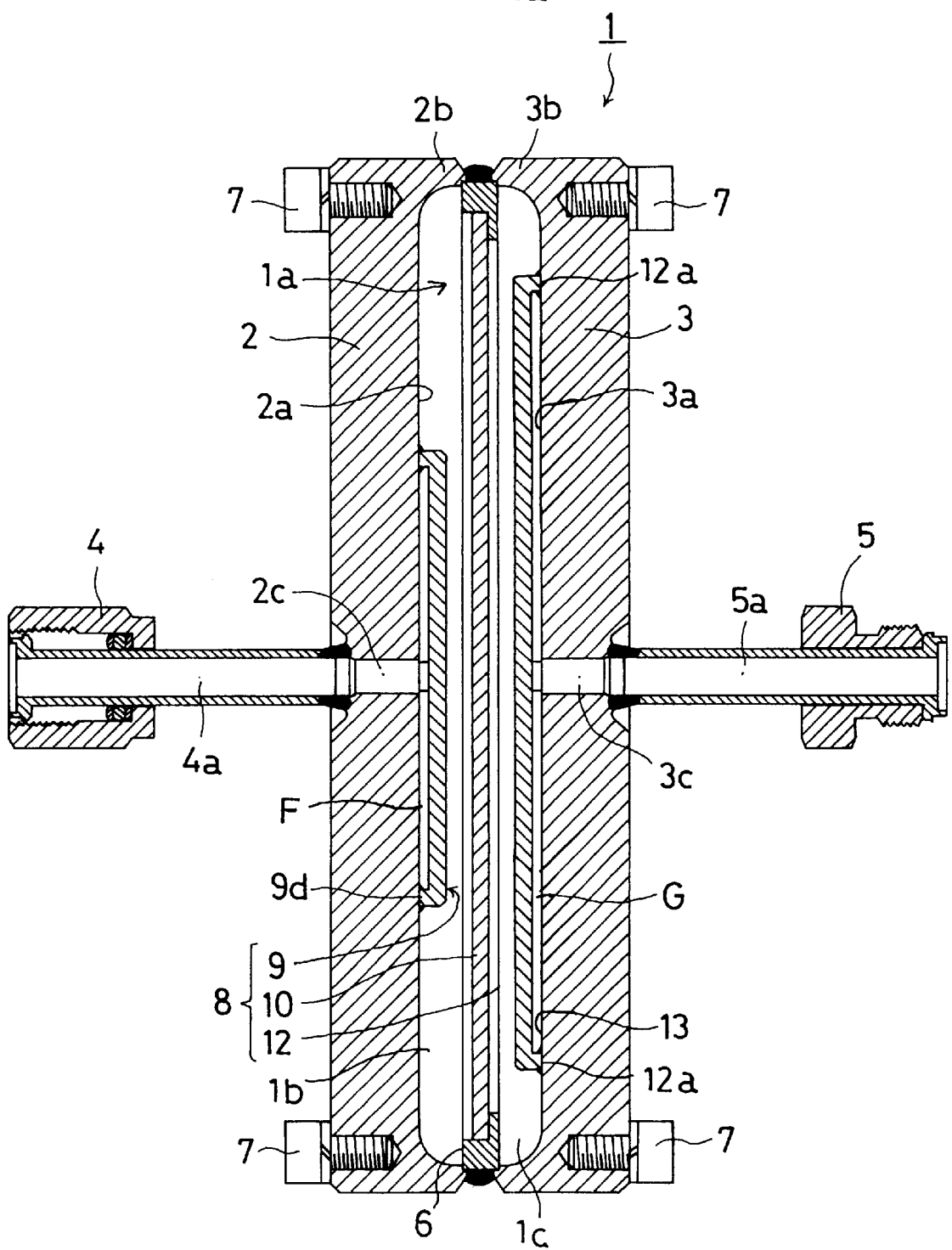
FIG. 11 is a vertical sectional side view of a still further variation of the second type reactor for generation of moisture corresponding to FIG. 8.

In the model 3 reactor, the reflector unit on the outlet side 12 may be made so large as to cover almost all the inside surface of the bottom wall 3a of the second reactor structural component 3 as shown in FIG. 11. That is, the outlet reflector unit 12 is enlarged until its periphery comes close to the inside surface of the peripheral wall 3b so that hydrogen and oxygen collide against or come in contact with the platinum coated catalyst layer 13 to be radicalized or react into water chiefly in the gap G area.

In the model 2 or model 3 reactor thus constituted, the starting material gas is jetted in through the material gas feed port 2c from the gas feed passage 4a of the gas feed joint 4. And the jetted starting material gas is dispersed by the inlet reflector unit 9 and spouted into the first reactor structural component 2. Diffused in the first reactor structural component 2, the gas then passes uniformly through all over the diffusion filter 10 and gets into the second reactor structural component 3. Inside the second reactor structural component 3, the mixed gas of hydrogen and oxygen uniformly collides against and comes in contact with all over the platinum coated catalyst layer 13, whereby the mixed gas is put to what is called the catalytic activation to produce water. Then, the water vapor formed chiefly inside the second reactor structural component 3 is led to the water vapor outlet port 3c through the gap G between the outlet reflector unit 12 and the second reactor structural component 3. Now, most of the mixed gas of hydrogen and oxygen entering the second reactor structural component 3 through the diffusion filter 10 is radicalized upon colliding against or coming in contact with the platinum coated catalyst layer, and the radicalized hydrogen and oxygen almost all react into water instantaneously. But part of the mixed gas of hydrogen and oxygen coming inside the second reactor structural component may flow straight. This mixed gas will collide against the outlet reflector unit 12 and will be diffused again. That drastically reduces the amount of hydrogen and oxygen coming inside the gap G without coming in contact with the platinum coated catalyst layer 13. Furthermore, the platinum coated catalyst layer 13 is formed on the part of the inside surface of the bottom wall 3a of the second reactor structural component 3, the part facing the outlet reflector unit 12. The mixed gas of hydrogen and oxygen that could arrive inside the gap G uncaught by the platinum coated catalyst layer 13 is bound to be activated there. Thus, the amount of hydrogen and oxygen which would be discharged unradicalized into the water vapor outlet port 3c is further decreased. Also, optimization of the gap G (between 0.5 and 2 mm) and the length of passage in the gap G, that is, the outside diameter of the outlet reflector unit 12, still further minimizes the amount of radicalized hydrogen and oxygen flowing to the water vapor outlet port 3c unreacted. Thus, almost all the radicalized hydrogen and oxygen contribute to the moisture generation reaction. Besides, the reactor shell 1 has therein the gas diffusion means 8 comprising the reflector unit on the inlet side 9, the diffusion filter 10 and the reflector unit on the outlet side 12. The provision precludes the possibility of the platinum coated catalyst layer 13 being locally heated by the heat of reaction and allows formation of water with the temperature kept under some 500° C. almost all over the platinum coated catalyst layer 13. That makes it possible to produce water at a high conversion ratio exceeding about 99.5 percent with a high degree of responsiveness in not smaller than 1,000 sccm of moisture on a safe and continuous basis.

Figure 12:
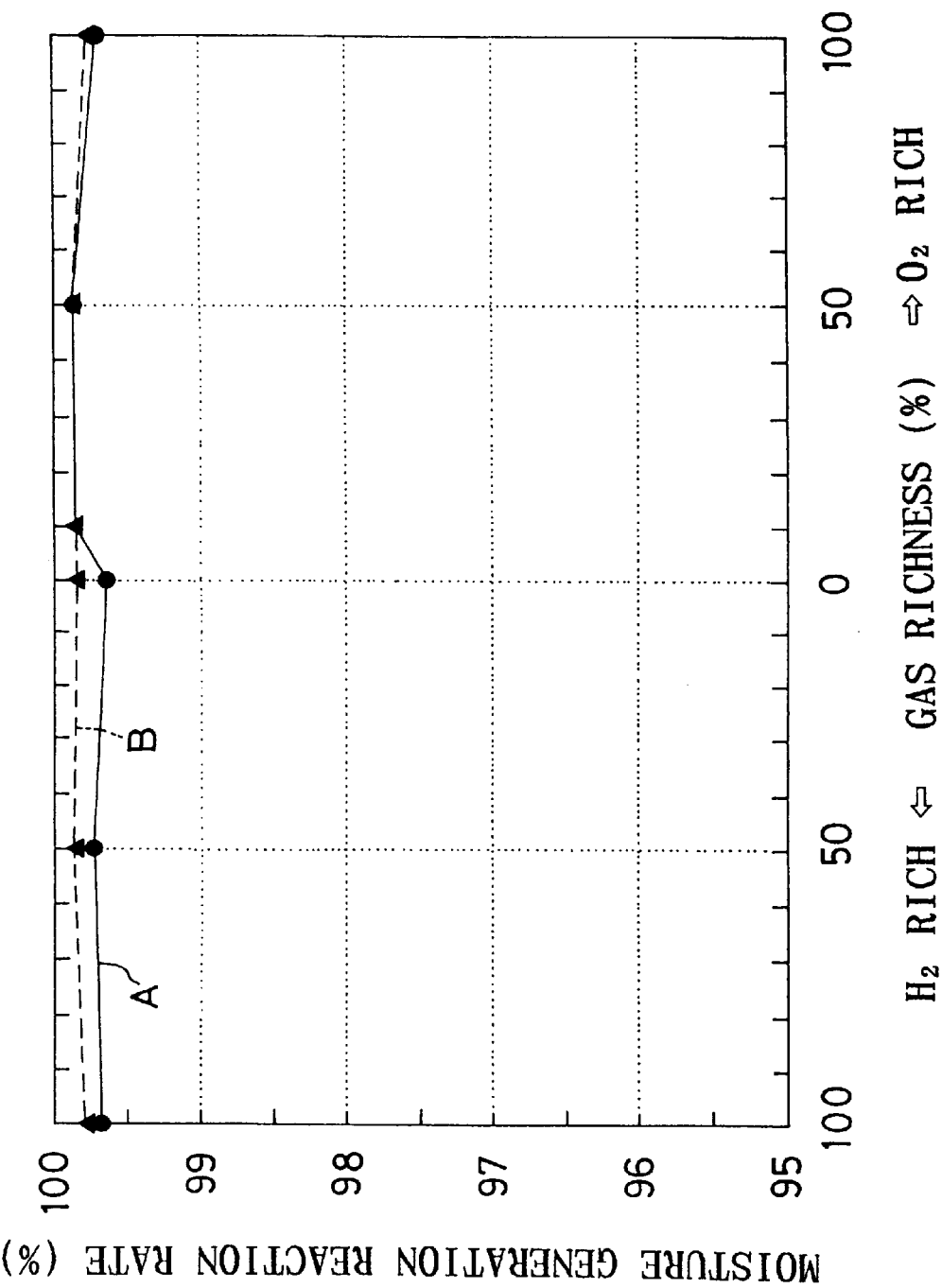
FIG. 12 depicts a curve showing the relationship between the moisture reaction rate and the gas richness in the second type reactor for generation of moisture according to the present invention.
Figure 13:
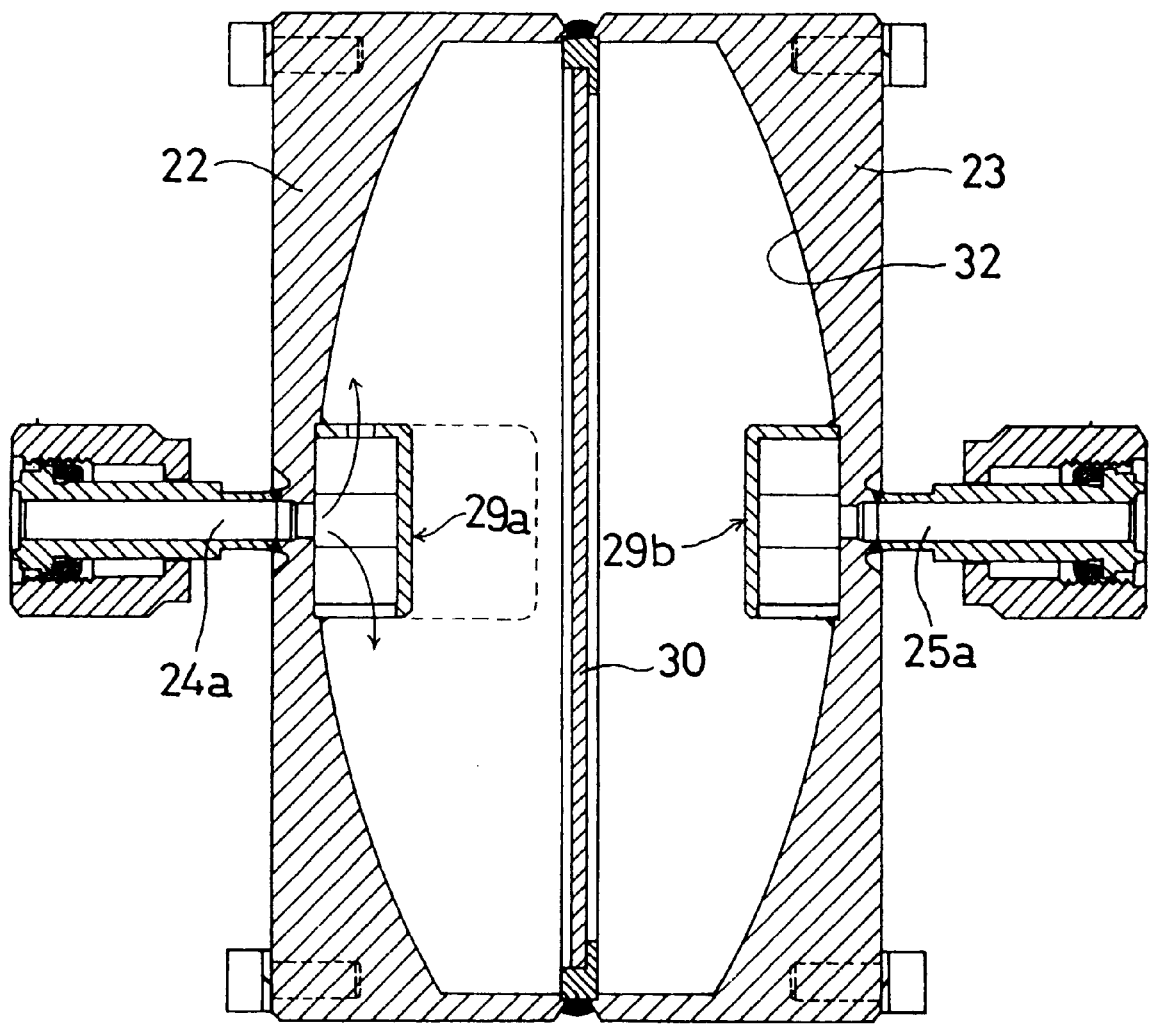
FIG. 13 is a vertical sectional side view of the prior art reactor for generation of moisture.
Figure 14:
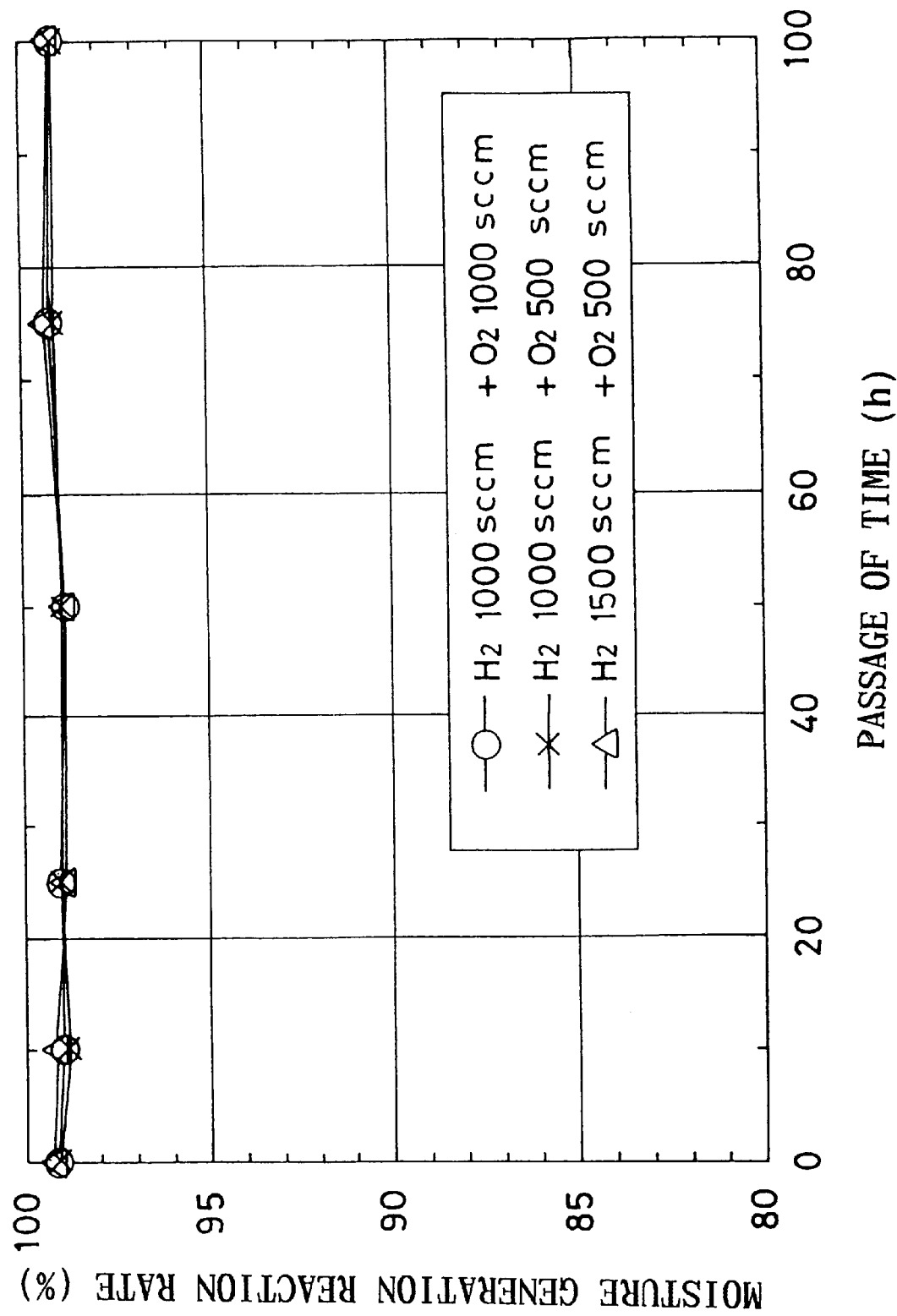
FIG. 14 depicts a curve showing the relationship between the moisture reaction rate and the passage of the time in the prior art reactor for generation of moisture.
Figure 15:
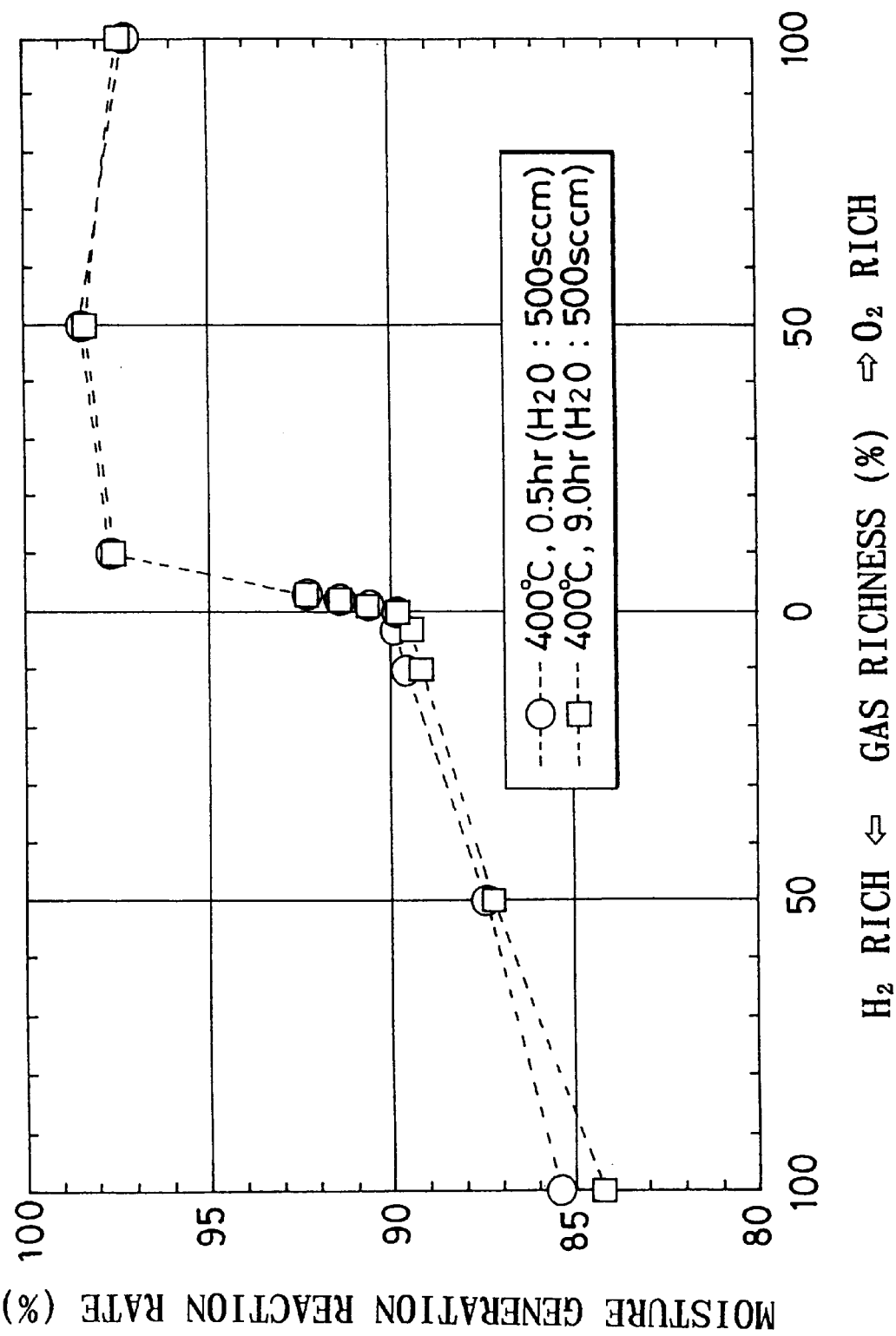
FIG. 15 depicts a curve showing the relationship between the moisture reaction rate and the gas richness in the prior art reactor for generation of moisture with the outlet reflector unit removed.

That is confirmed by a moisture generation experiment conducted in a 10-hour continuous operation using the model 2 reactor as shown in FIG. 5, the dimensions of the reactor including the catalytic area (surface area of the platinum coated catalyst layer 13), 139.0 cm2; volume of the second chamber 1c, 196.9 cm3; H2O gas, 1,000 sccm, and in another 10-hour test by the model 3 reactor shown in FIG. 8 of which the a dimensions were the catalytic area (surface area of the platinum coated catalyst layer 13), 98.3 cm2; volume of the second chamber 1c, 42.8 cm3; H2O gas, 750 sccm. In those moisture generation experiments, the mixing ratio of hydrogen and oxygen in the starting material gas fed from the gas feed passage 4a was varied with measurements taken of the quantity of moisture flowing out to the water vapor outlet passage 5a to find the moisture generation reaction rate. The results are illustrated in FIG. 12. In FIG. 12, the solid line A indicates the moisture generation reaction rate in the model 2 reactor, while the dotted line denotes the reaction rate by the model 3 reactor. As is evident from FIG. 12, a moisture producing reactivity efficiency or reaction rate of 99.5 percent or higher could be achieved not only with oxygen-rich material gas but also with hydrogen-rich material gas, not to mention the balanced mixture with no excess of either hydrogen or oxygen in either the model 2 reactor or the model 3 reactor. It is also noted that the temperature measured at the outlet reflector unit 12 was not higher than 500° C. in both model 2 reactor and model 3 reactor.

While preferred embodiments of the invention have been described in detail, it will be obvious to those skilled in the art that changes, variations and equivalents may be made without departing from the spirit or scope of the invention. The scope of the invention is therefore to be determined by the appended claims and their equivalents.

What is claimed is:

1. A reactor for the generation of moisture by the reaction of hydrogen and oxygen to produce water, said reactor comprising:

a reactor shell having a first reactor structural component and a second reactor structural component, said structural components being united to define a sealed interior space;

a diffusion filter partitioning said sealed interior space into a first chamber and a second chamber;

a starting material gas feed port in said first reactor structural component for supplying a starting material gas to said sealed interior space;

a water vapor outlet port in said second reactor structural component for leading water produced in said sealed interior space out of said sealed interior space;

a reflector unit disposed in said first chamber opposite said starting material gas feed port, said reflector unit comprising a cylindrical casing fixed on said first reactor structural component, side openings formed in said cylindrical casing, and a reflector closing an end opening of said cylindrical casing;

a reflector-diffuser unit disposed in said second chamber opposite said water vapor outlet port, said reflector-diffuser unit comprising a further cylindrical casing fixed on said second reactor structural component, side openings formed in said further cylindrical casing, a reflector closing an end opening of said further cylindrical casing, an outlet diffusion filter provided inside said further cylindrical casing, and a platinum coated catalyst layer formed on the outlet diffusion filter; and, a platinum coated catalyst layer formed on the inside surface of said second reactor structural component.

2. A reactor for the generation of moisture as claimed in claim 1, wherein said first and said second reactor structural components comprise first and second cylinders, respectively, each cylinder having an open first end, a peripheral wall and an end wall closing a second end, said cylinders being united air-tight at their open first ends with said diffusion filter being disposed between said open first ends, said platinum coated catalyst layer formed on the inside surface of said second reactor structural component covering the inside surface of said second cylinder, the end wall of said first cylinder having said starting material gas feed port mounted in the center thereof with said casing of said reflector unit concentric with said starting material gas feed port, and the end wall of the second cylinder having said water vapor outlet port mounted in the center thereof with said casing of said reflector-diffuser unit concentric with said water vapor outlet port.

3. A reactor for the generation of moisture as claimed in claim 1, wherein said outlet diffusion filter has pores more than 50 microns in diameter.

4. A reactor for the generation of moisture by the reaction of hydrogen and oxygen to produce water, said reactor comprising:

a reactor shell having a first reactor structural component and a second reactor structural component, said structural components being united to define a sealed interior space;

a diffusion filter partitioning said sealed interior space into a first chamber and a second chamber;

a starting material gas feed port in said first reactor structural component for supplying a starting material gas to said sealed interior space;

a water vapor outlet port in said second reactor structural component for leading water produced in said sealed interior space out of said sealed interior space;

a reflector unit disposed in said first chamber opposite said starting material gas feed port, to diffuse said starting material gas supplied from said starting material gas feed port;

a disk reflector unit disposed in said second chamber, said disk reflector unit being concentric with said water vapor outlet port and spaced from said second reactor structural component by from 0.5 to 2.0 mm; and, a platinum coated catalyst layer formed on the inside surface of said second reactor structural component.

5. A reactor for the generation of moisture as claimed in claim 1 or claim 4, wherein said diffusion filter partitioning said sealed interior space has through pores not larger than 200 microns in diameter.

6. A reactor for the generation of moisture as claimed in claim 1 or claim 4, wherein said platinum coated catalyst layer on the inside surface of said second reactor structural unit is of a double layer construction having a barrier coat made of nitride with a platinum coat formed on the surface thereof.

7. A reactor for the generation of moisture as claimed in claim 4, wherein said first and second reactor structural components comprise first and second cylinders, respectively, each cylinder having an open first end, a peripheral wall and an end wall closing a second end, said cylinders being united air-tight at their open first ends with said diffusion filter being disposed between said open first ends, said platinum coated catalyst layer formed on the inside surface of said second reactor structural component being on the end wall of said second cylinder, the end wall of said first cylinder having said starting material gas feed port mounted in the center thereof and mounted with said reflector unit concentric with said starting material gas feed port, and the end wall of said second cylinder having said water vapor outlet port mounted in the center thereof with said casing of said reflector-diffuser unit concentric with said water vapor outlet port and spaced 0.5–2.0 mm from the inside surface of the end wall of said second cylinder.

8. A reactor for the generation of moisture as claimed in claim 7, wherein said end walls have an inside surface with a shape taken from the group of shapes consisting of flat and concave.

9. A reactor for the generation of moisture as claimed in claim 7 wherein said reflector unit comprises a cylindrical casing fixed on the end wall of said first cylinder concentric with said starting material gas feed port, side openings formed in said cylindrical casing and a reflector closing an end opening of said cylindrical casing.

10. A reactor for the generation of moisture as claimed in claim 7, wherein said reflector unit is enlarged until the periphery thereof comes close to a peripheral wall of said second reactor structural component.

11. A reactor for the generation of moisture as claimed in claim 4, wherein a platinum coated catalyst layer for said disk reflector unit is formed on a side thereof facing the second reactor structural component, said layer being of the same type as the platinum coated catalyst layer formed on the inside surface of said second reactor structural component.

12. A reactor for the generation of moisture as claimed in claim 4, wherein said reflector unit is disk-shaped and supported on, but spaced from said first reactor structural component by 0.5–2.0 mm.

* * * * *